US006583405B2

(12) United States Patent
Walbe

(10) Patent No.: US 6,583,405 B2
(45) Date of Patent: Jun. 24, 2003

(54) GLASS BREAKAGE DETECTION USING GAS DISCHARGE LIGHTING

(76) Inventor: Vince Walbe, Rte. 2, P.O. Box 5373, Roland, OK (US) 74954

(*) Notice: Subject to any disclaimer, the term of this patent is extended or adjusted under 35 U.S.C. 154(b) by 0 days.

(21) Appl. No.: 09/808,696

(22) Filed: Mar. 14, 2001

(65) Prior Publication Data

US 2002/0130629 A1 Sep. 19, 2002

Related U.S. Application Data

(60) Provisional application No. 60/225,806, filed on Aug. 16, 2000.

(51) Int. Cl.[7] .......... G02F 1/01; G01N 21/00

(52) U.S. Cl. .......... 250/223 B; 356/240.1

(58) Field of Search .......... 315/86, 246; 250/223 B; 209/526; 435/34; 313/485, 631; 356/240.1, 241.1

(56) References Cited

U.S. PATENT DOCUMENTS

| | | | | | |
|---|---|---|---|---|---|
| 3,771,649 | A | * | 11/1973 | Strauss | 209/74 R |
| 4,081,991 | A | * | 4/1978 | Powers, Jr. | 73/41 |
| 4,305,816 | A | * | 12/1981 | Flood et al. | 209/549 |
| 4,655,349 | A | * | 4/1987 | Joseph et al. | 209/524 |
| 4,781,742 | A | | 11/1988 | Hill et al. | 65/29.18 |
| 4,874,940 | A | * | 10/1989 | McMeekin et al. | 250/233 |
| 4,924,083 | A | * | 5/1990 | Ishikawa et al. | 250/223 B |
| 5,405,015 | A | * | 4/1995 | Bhatia et al. | 209/524 |
| 5,436,722 | A | * | 7/1995 | Baldwin | 356/239.4 |
| 5,474,910 | A | | 12/1995 | Alfano | 435/34 |
| 5,483,124 | A | * | 1/1996 | Kaviani | 315/86 |
| 5,523,655 | A | | 6/1996 | Jennato et al. | 315/246 |
| 5,664,352 | A | | 9/1997 | Beckman | 40/545 |
| 5,923,118 | A | | 7/1999 | Jennato et al. | 313/485 |
| 5,926,268 | A | * | 7/1999 | Bonewitz et al. | 356/240 |
| 5,982,097 | A | | 11/1999 | Mehrotra et al. | 313/631 |
| 6,226,081 | B1 | * | 5/2001 | Fantone et al. | 356/239.6 |
| 6,361,186 | B1 | * | 3/2002 | Slayden | 362/249 |

* cited by examiner

*Primary Examiner*—Don Wong
*Assistant Examiner*—Minh D A
(74) *Attorney, Agent, or Firm*—Mark Rogers; Gary N. Speed

(57) ABSTRACT

A method of detecting broken glass is disclosed comprising determining an area to be searched for broken glass and temporarily illuminating the area using a high operating voltage gas discharge lamp while the broken glass is found and removed. In an industrial application, the method involves illuminating an area around a glass processing machine with a high operating voltage gas discharge lamp. In operation, the area around the machine is illuminated with the lamp, and the machine is operated to move and process glass objects. The illuminated area is monitored for the presence of broken glass. When broken glass is detected, movement of the glass objects may be temporarily halted while the broken glass is located and removed. The lamp preferably has an operating voltage of no less than approximately 2,000 volts and an operating amperage of no greater than approximately 120 milliamps.

11 Claims, 2 Drawing Sheets

GLASS BREAKAGE DETECTION USING GAS DISCHARGE LIGHTING

CROSS-REFERENCE TO RELATED APPLICATIONS

This is a provisional of U.S. Provisional application No. 60/225,806, filed on Aug. 16, 2000.

BACKGROUND OF THE INVENTION

This invention relates to lighting systems, and more particularly to lighting systems used near glass processing machinery.

In industrial operations in which glass objects are processed, glass breakage is a significant concern. Some of the more obvious concerns include product safety and product spoilage. Some less obvious, but still significant, concerns are worker safety and productivity. In an industrial setting, when a glass object is broken by a glass processing machine, such as a glass container filling machine, or by a conveyor line, the machine or line is typically shut down until the broken glass is located and removed. The failure to locate all or substantially all of the broken glass can create a workplace hazard. Also, the longer it takes to locate and remove the broken glass, the longer the machine sits idle, the longer some workers sit idle, the longer some workers spend performing the task, and the greater productivity declines. The present invention relates to a new use for a known type of lighting to provide for better, easier, and faster location and removal of broken glass from around glass processing machines.

Gas discharge lighting is well known in the art. In a gas discharge light, atoms or molecules of a gas inside a tube are ionized by an electric current passing through the gas or by a radio frequency or microwave field in proximity to the tube. This excitation of the gas generates light, typically visible or ultraviolet (UV). One common gas discharge lamp is a fluorescent lamp, which is commonly used in homes, offices, and industrial settings. In fluorescent lamps, lights, or tubes, electrodes are provided at opposite ends of a tube, and the tube ends are sealed, typically with mercury and a gas such as argon sealed within the tube at low pressure. The inside of the tube is coated with one or more phosphors that produce visible light when excited by UV radiation. When power is applied to the lamp, the mercury and gas mixture emits primarily UV radiation, which comes primarily from the mercury. The invisible UV radiation excites the phosphor coating, and the phosphor coating emits visible light. A fluorescent lamp typically requires a starting voltage of several hundred volts to initiate the UV radiation discharge, but once the discharge is initiated, a much lower operating voltage is needed, such as under approximately 100 V for tubes under 30 watts and approximately 100 V to approximately 175 V for tubes of 30 watts or more. A ballast is used to provide the initial, temporary increase in starting voltage and then to serve as a current limiter. Fluorescent lighting has a number of advantages over incandescent lighting and is useful in industrial lighting applications. Still, fluorescent lighting does not provide the advantages of the present invention in making it easier and faster to locate and remove broken glass from an area around glass processing machines. "Neon" lights are also known in the art. "Neon" lamps, lights, or tubes are commonly used in commercial signs. Similar to fluorescent lamps, in "neon" lamps, lights, or tubes, electrodes are provided at opposite ends of a tube, and the tube ends are sealed, typically with one or more gases, such as neon or argon sealed within the tube at low pressure. The inside of the tube is sometimes coated with one or more phosphors, depending upon the color desired. Although such lamps are often known generically as "neon" lights, gases other than neon may be used depending upon the desired color. Typical gases used in neon lights include, but are not limited to neon, argon, helium, hydrogen, krypton, nitrogen, and xenon, and combinations thereof. Further, neon gas may not even be present in "neon" tubes. "Neon" lights typically operate at high voltage that is typically not less than approximately 2,000 volts and that is more typically within a range of from approximately 2,000 volts to approximately 15,000 volts. Similarly, "neon" lights typically operate at a low amperage that is typically not greater than approximately 120 milliamps and that is more typically within a range of from approximately 30 milliamps to approximately 120 milliamps.

To further confuse the distinction between "neon" lights and fluorescent lights, neon gas may occasionally be present in fluorescent lights. Still, there are significant differences between fluorescent and "neon" lights that, in accordance with the present invention, render "neon" lights particularly useful for locating and removing broken glass from around glass processing machines. For example, "neon" lights use higher operating voltage and lower operating amperage to provide a brighter, more intense light. Also, a transformer is used in connection with a "neon" light to provide a continuous source of high operating voltage, in the thousands of volts, and low operating amperage, in the milliamp range, as opposed to a ballast used in connection with a fluorescent light to provide an initial, temporary increase in voltage, or starting voltage, typically in the hundreds of volts, and then to serve as a current limiter. As used in this specification, the term "high operating voltage gas discharge" lamp or light or tube is used to refer to what is commonly, generically considered a "neon" lamp or light or tube regardless of whether neon gas is actually present in such lamp, light, or tube and regardless of the current passing through such lamp, light, or tube, so long as the operating current or voltage is not less than approximately 2,000 volts. In this manner, the term "high operating voltage gas discharge" lamp or light or tube is used to distinguish such "neon" lamps, lights, or tubes from what is commonly, generically considered fluorescent lamps, lights, or tubes. The phrase "high operating voltage" further distinguishes "neon" lights from fluorescent lights that may have moderate or high "starting" voltages but that have lower "operating" voltages.

Before the present invention, "neon" lights were used primarily for ornamental purposes in commercial signs. Before the present invention, there was no recognition that "neon" lights, or high operating voltage gas discharge lights, might be useful in locating and removing broken glass around glass processing machines. At his job, the present inventor often worked around a glass processing machine, more particularly a glass container filling machine. A conveyor line passed empty glass jars to the glass container filling machine, the machine filled the jars with food, and a conveyor line passed the filled jars from the machine. It is inevitable, or virtually inevitable, that glass jars are broken during this operation. In addition to product safety and product spoilage concerns, broken jars also raised concerns about workplace safety and productivity. One evening, as the present inventor walked across a store parking lot, he noticed some broken glass in the parking lot that appeared to be glowing. The broken glass was very easy to see, even from a distance. The present inventor recognized that making broken glass "glow" in this manner would be very beneficial in locating and removing broken glass from around the glass container filling machine at his workplace. He studied the area and determined that light from a "neon" sign was giving the broken glass its glowing appearance. He revealed his idea to his employer, and his invention was used around the glass container filling machine.

Upon implementation of his invention, broken glass became much easier to locate and remove, down time for locating and removing broken glass decreased, and productivity increased.

SUMMARY OF THE INVENTION

It is therefore an object of the present invention to provide a method and system for increasing safety and productivity associated with operating a glass processing machine.

It is a further object of the present invention to provide a method and system of the above type that makes it easier and faster to locate and remove broken glass from around a glass processing machine and conveyor line.

It is a still further object of the present invention to provide a method and system of the above type that reduces down time associated with locating and removing broken glass from around a glass processing machine and conveyor line.

It is a still further object of the present invention to provide a method and system of the above type that provides for superior location and removal of broken glass from around a glass processing machine and conveyor line.

It is a still further object of the present invention to provide a method and system of the above type that makes it easier and faster to locate and remove contaminants from a glass processing machine and conveyor line and from areas around the same.

Toward the fulfillment of these and other objects and advantages, the method of the present invention comprises determining an area to be searched for broken glass and temporarily illuminating the area using a high operating voltage gas discharge lamp while the broken glass is found and removed. In an industrial application, the method and system involve illuminating an area around a glass processing machine with a high operating voltage gas discharge lamp. Such a glass processing method and system may comprise a glass processing machine, a conveyor line for transporting a plurality of glass objects to or from the glass processing machine, and a high operating voltage gas discharge lamp. The high operating voltage gas discharge lamp is disposed to illuminate an area around the glass processing machine and conveyor line. In operation, the area around the machine and conveyor line is illuminated with the high operating voltage gas discharge lamp, and the machine and line are operated to move and process a plurality of glass objects. The machine, conveyor line, and illuminated area are monitored for the presence of broken glass. When broken glass is detected, movement of the glass objects may be temporarily halted while the broken glass is located and removed. The high operating voltage gas discharge lamp is preferably powered with an operating voltage of no less than approximately 2,000 volts and an operating amperage of no greater than approximately 120 milliamps. The flooring around the machine and line may be colored a dark color, such as black, to increase the visibility of the illuminated broken glass.

BRIEF DESCRIPTION OF THE DRAWINGS

The above brief description, as well as further objects, features and advantages of the present invention will be more fully appreciated by reference to the following detailed description of the presently preferred but nonetheless illustrative embodiments in accordance with the present invention when taken in conjunction with the accompanying drawings, wherein.

DETAILED DESCRIPTION OF THE PREFERRED EMBODIMENT

Figure 1:
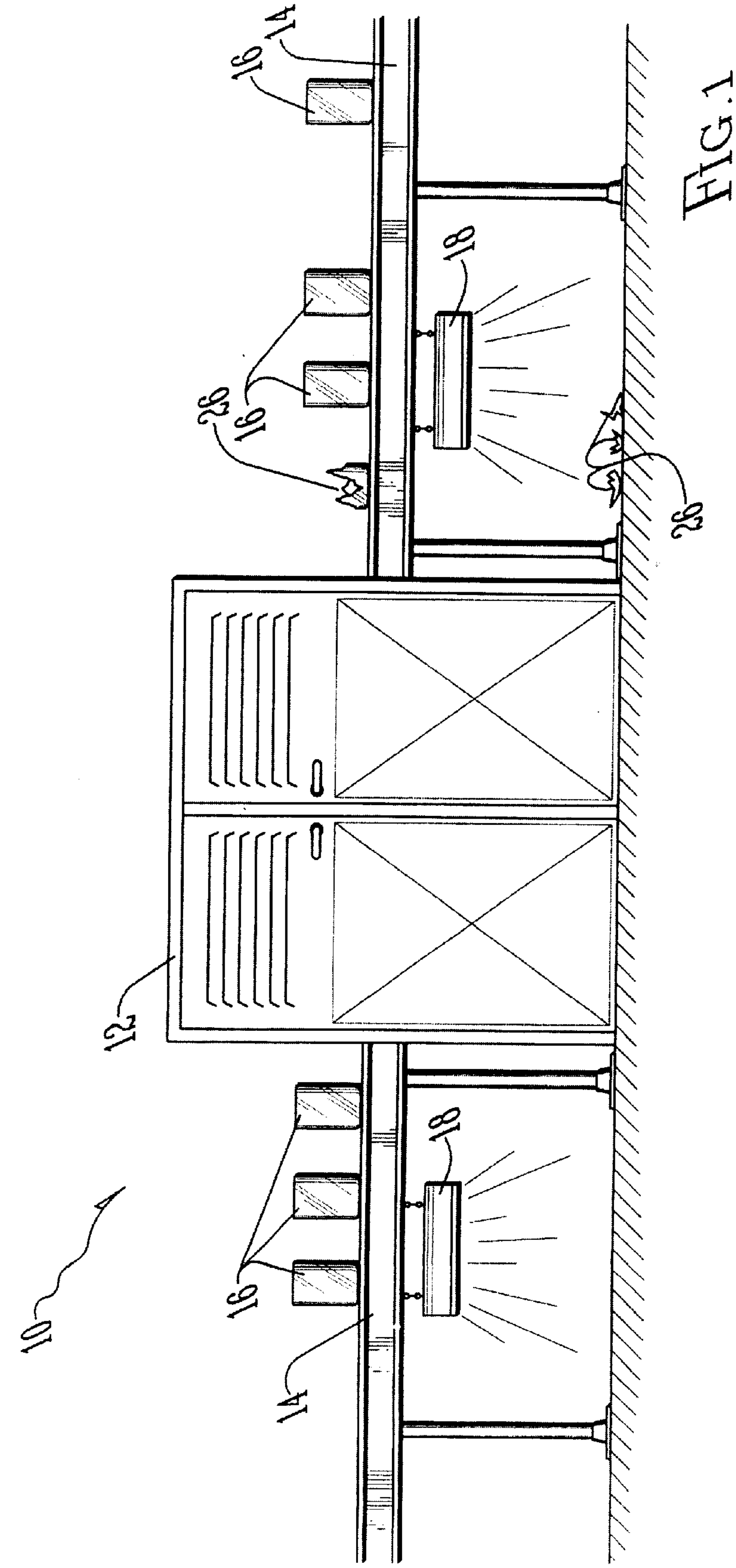
FIG. 1 is a side elevation, schematic view of a glass processing line of the present invention.

Referring to FIG. 1, the reference numeral 10 refers in general to a glass processing system of the present invention. The system comprises a glass processing machine 12, a conveyor line 14, a plurality of glass objects 16, and a high operating voltage gas discharge lamp 18.

The glass processing machine 12 may be any of a wide variety of glass processing machines now known or later developed. Examples include but are not limited to glass container filling machines, glass object manufacturing machines, glass object transporting machines, and glass object packaging machines. If a machine handles a plurality of glass objects and is prone to occasional glass breaks, the present invention may be used in combination with that machine to increase safety and productivity. The glass processing system of the present invention is particularly useful in industrial settings in which large numbers of glass objects are moved, filled, worked upon, or the like. It is in these industrial settings in which it becomes more important to minimize equipment and labor down time and to minimize labor requirements to locate and remove broken glass.

The conveyor line 14 of the present invention may be formed using a wide variety of different types of conveyor equipment now known or later developed. Conveyor lines 14 may be used to transport a plurality of glass objects to and/or from a glass processing machine 12. It is understood that the invention may be used with or without an accompanying conveyor line. The inclusion and discussion of the use of one or more conveyor lines is intended to emphasize that the present invention is intended primarily for industrial uses. Including such limitations in any claims is similarly intended to emphasize the industrial uses or the present invention and to distinguish the present invention from a wide variety of non-industrial uses, such as a soda dispensing machine that may by chance be located near a "neon" commercial sign outside a store.

The glass objects 16 may be any of a wide variety of glass objects now known or later developed. The glass objects may be, but are not limited to, jars, bottles, bulbs, containers, decorations, or ornamental objects of any number of shapes, sizes, uses, or compositions. The present inventor designed the system of the present invention in light of problems experienced with a glass jar filling machine that filled glass jars with food, but the solution is useful in connection with a wide variety of machines that handle a wide variety of glass objects.

Figure 3:
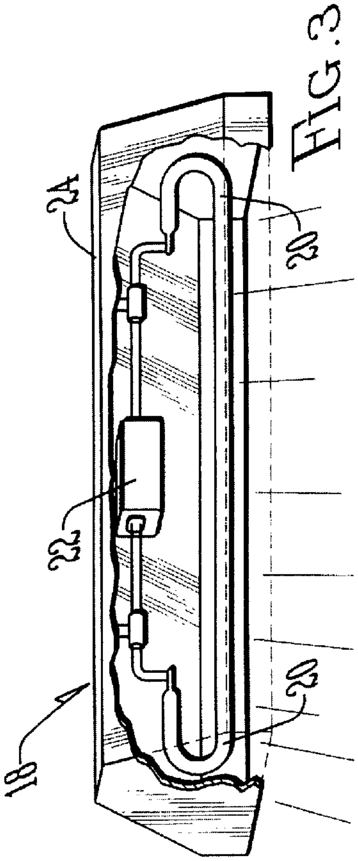
FIG. 3 is a partially exploded, elevation view of a high operating voltage gas discharge lamp for use in connection with the present invention.

The high operating voltage gas discharge lamp 18 of the present invention is the type of lamp typically referred to generically as a "neon" lamp as is commonly used in commercial signs. Referring to FIG. 3, in these lamps 18, electrodes are provided at opposite ends of a tube 20, and the tube ends are sealed, typically with one or more gases, such as neon or argon sealed within the tube at low pressure. The pressure within such a tube is preferably less than atmospheric pressure, is more preferably within a range that is from approximately 3 torr to approximately 100 torr, and is most preferably within a range of from approximately 5 torr to approximately 20 torr. This is in contrast to the high pressures typically associated with high intensity discharge lamps, such as high pressure mercury vapor lamps, high pressure metal halide lamps, and high pressure sodium vapor lamps. The inside of the tube 20 is sometimes coated with one or more phosphors, depending upon the color desired. Although such lamps 18 are often known generically as "neon" lights, gases other than neon may be used depending upon the desired color. Typical gases used in neon lights include, but are not limited to neon, argon, helium, hydrogen, krypton, nitrogen, and xenon, and combinations thereof. Further, neon gas may not even be present in "neon" tubes. "Neon" lights typically operate at a high operating voltage that is preferably not less than approximately 2,000 volts, that is more preferably substantially within a range of from approximately 2,000 volts to approximately 15,000 volts, and that is most preferably substantially within a range of from approximately 6,000 volts to approximately 15,000 volts. Similarly, "neon" lights typically operate at a low operating amperage that is preferably not greater than approximately 120 milliamps and that is more preferably substantially within a range of from approximately 30 milliamps to approximately 120 milliamps. A transformer 22 is used to transform electricity from a power source to an appropriate operating voltage and operating amperage. A housing 24 may be provided for safety concerns as well as to focus and direct light from the tube 20. The housing 24 preferably provides a waterproof seal to protect the tube 20 and transformer 22 during cleaning of the glass processing system 10.

Referring to FIG. 1, in operation, one or more high operating voltage gas discharge lamps 18 are positioned around a glass processing machine 12 and one or more conveyor lines 14 to illuminate an area around the glass processing machine and/or the conveyor lines 14. The lamps 18 may be positioned in any number of locations or configurations depending upon the area to be lit. The lamps 18 may for example be suspended from or affixed to the glass processing machine or conveyor lines 14 or may be positioned to partially encircle or outline an area containing the glass processing machine 12 or conveyor lines 14. In one preferred embodiment, the lamps 18 are positioned under the conveyor lines 14, suspended from the conveyor lines 14. Once in position, the lamps 18 are turned on to illuminate an area around the glass processing machine 12 and conveyor lines 14. The glass processing machine 12 and conveyor lines 14 are activated to transport a plurality of glass objects 16 to the machine 12, to process the glass objects 16 by or within the machine 12, and to transport the glass objects 16 away from the machine 12 after processing. One or more operators monitor the system for glass breaks or for the presence of broken glass 26 in or near the machine 12, conveyor line 14, or illuminated area. Upon detection of broken glass 26 in or near the machine 12, conveyor line 14, or illuminated area, the broken glass 26 is located and removed. Upon detection of broken glass 26, the machine 12 and conveyor line 14 are preferably deactivated to halt movement of the glass objects 16 while the broken glass 26 is located and removed. After the broken glass 26 is located and removed, the machine 12 and conveyor line 14 are reactivated to resume movement and processing of the glass objects 16.

The flooring in the area around the machine 12 and conveyor lines 14 is preferably a dark color such as black to provide a more vivid contrast with the illuminated broken glass 26, making the broken glass even easier to locate at a distance. For improving the visibility of the broken glass 26, the high operating voltage gas discharge lamp 18 preferably illuminates the area with white or green light and more preferably illuminates the area with white light. As an added benefit, it was also discovered that illuminating the machine 12, conveyor line 14 and surrounding area with light from a high operating voltage gas discharge lamp 18 also increases the visibility of things such as spilled food, bacteria, mold, mildew, and other contaminants.

This allows for better, faster, and easier cleaning of the machine 12, conveyor lines 14 and surrounding areas.

It is understood that the present invention may find application in areas other than industrial areas and may be useful in locating broken glass 26 in a wide variety of settings, including but not limited to hospitals, stores, schools, warehouses, and other areas in which glass breakage is to be expected. In that regard, a user determines an area to be searched for broken glass 26 and activates one or more lamps 18 to temporarily illuminate the area to be searched.

After the area is illuminated by the lamp 18, the broken glass 26 is found and removed. After the broken glass 26 is found and removed, the lamp 18 is deactivated. In instances in which a portable lamp 18 is to be used, the lamp 18 may be stored elsewhere and may be moved to an area to be searched only during while the broken glass is found and removed.

Figure 2:
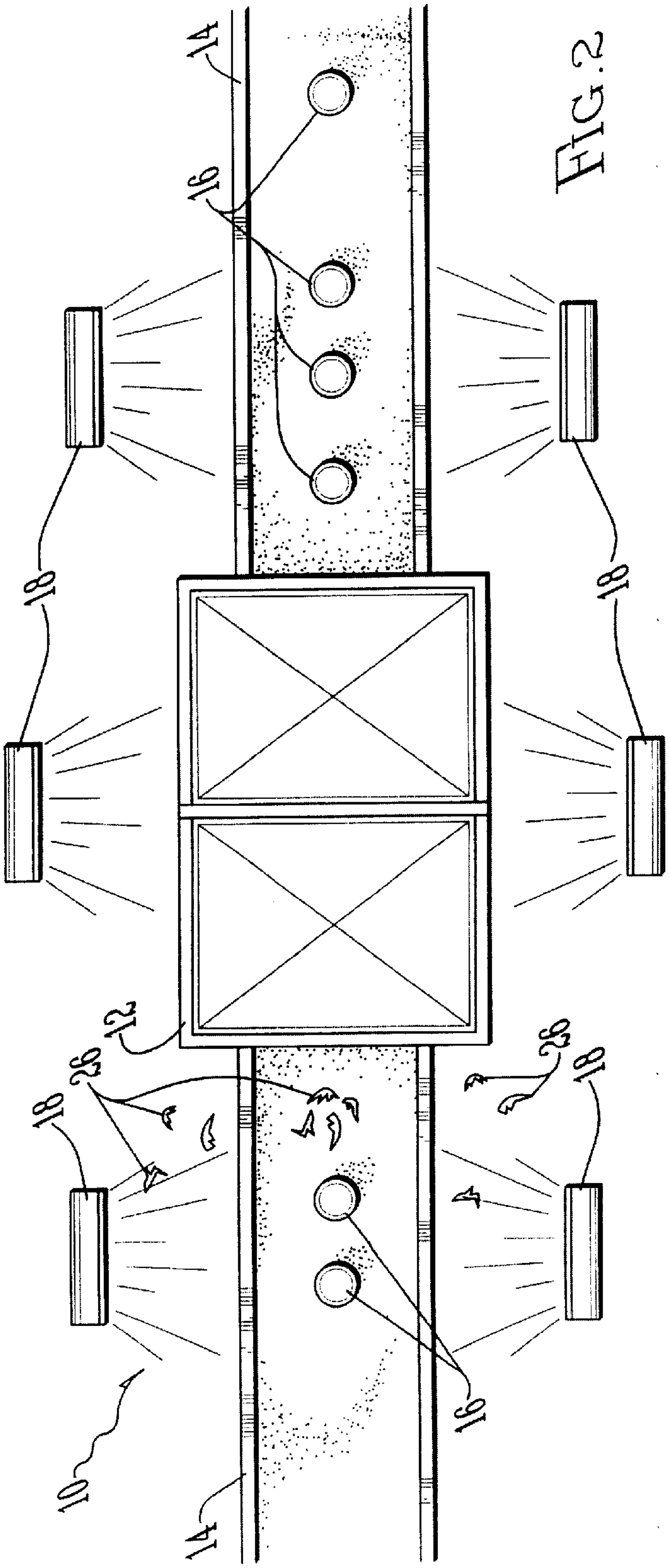
FIG. 2 is an overhead, schematic view of a glass processing line of the present invention.

Other modifications, changes and substitutions are intended in the foregoing, and in some instances, some features of the invention will be employed without a corresponding use of other features. For example, although the system the depicted in FIGS. 1 and 2 use more than one conveyor line 14, the system may be used with one conveyor line 14 or no conveyor line. Further, although the specification refers to "neon" lighting, it is understood that neon gas need not be present within a lamp for the lamp to be a "neon" light. Further still, although green or white light is preferred, the high operating voltage gas discharge lamps may provide light of any of a wide variety of colors and shades. Finally, all examples and quantitative amounts are given by way of example only and are not intended to limit the scope of the invention. Accordingly, it is appropriate that the appended claims be construed broadly and in a manner consistent with the scope of the invention.

What is claimed is:

1. A method of detecting broken glass, comprising:

(1) providing a glass processing system comprising a glass container filling machine and a conveyor line;

(2) positioning a high operating voltage gas discharge lamp under said conveyor line;

(3) transforming current provided to said high operating voltage gas discharge lamp to an operating amperage that is not greater than approximately 120 milliamps;

(4) transforming voltage provided to said high operating voltage gas discharge lamp to an operating voltage that is not less than approximately 2,000 volts; and (5) illuminating an area around said glass processing system with said high operating voltage gas discharge lamp.

2. The method of claim 1, wherein said step of illuminating said area around said glass processing system with said high operating voltage gas discharge lamp comprises illuminating said area around said glass processing system with said high operating voltage gas discharge lamp having a fill gas comprising neon.

3. The method of claim 1, wherein said step of illuminating said area around said glass processing system with said high operating voltage gas discharge lamp comprises illuminating said area around said glass processing system with said high operating voltage gas discharge lamp having a fill gas selected from the group consisting of neon, argon, helium, hydrogen, krypton, nitrogen, or xenon, or combinations thereof.

4. A method of detecting broken glass, comprising:

(1) providing a glass processing system comprising a glass processing machine and a conveyor line;

(2) operating said glass processing system to move a plurality of glass objects;

(3) transforming current provided to said high operating voltage gas discharge lamp to an operating amperage that is not greater than approximately 120 milliamps;

(4) transforming voltage provided to said high operating voltage gas discharge lamp to an operating voltage that is not less than approximately 2,000 volts;

(5) before step (6), positioning said high operating voltage gas discharge lamp under said conveyor line; and (6) illuminating an area around said glass processing system with a high operating voltage gas discharge lamp.

5. The method of claim 4, further comprising:

monitoring said illuminated area for the presence of broken glass;

halting movement of said plurality of glass objects upon detection of said broken glass;

removing said detected broken glass; and resuming movement of said plurality of glass objects after said broken glass is removed.

6. The method of claim 4, wherein step (6) comprises illuminating said area around said glass processing system with said high operating voltage gas discharge lamp, said high operating voltage gas discharge lamp having a fill gas comprising neon.

7. The method of claim 4, wherein step (6) comprises illuminating said area around said glass processing system with said high operating voltage gas discharge lamp, said high operating voltage glass discharge lamp having a fill gas selected from the group consisting of neon, argon, helium, hydrogen, krypton, nitrogen, or xenon, or combinations thereof.

8. A method of detecting broken glass, comprising:

(1) providing a glass processing system comprising a glass processing machine and a conveyor line;

(2) determining an area to be searched for broken glass;

(3) after step (2), positioning a high operating voltage gas discharge lamp under said conveyor line in said area to be searched for said broken glass;

(4) after step (3), activating said high operating voltage gas discharge lamp to temporarily illuminate said area during finding and removal of said broken glass;

(5) transforming current provided to said high operating voltage discharge lamp while said high operating voltage discharge lamp is activated to an operating amperage that is not greater than approximately 120 milliamps and transforming voltage provided to said high operating voltage discharge lamp while said high operating voltage discharge lamp is activated to an operating voltage that is not less than approximately 2,000 volts; (6) after illuminating said area with said high operating voltage gas discharge lamp, finding and removing said broken glass; and (7) deactivating said high operating voltage gas discharge lamp after said broken glass is found and removed.

9. The method of claim 8, further comprising;

after step (2), moving said high operating voltage gas discharge lamp to said area; and after step (7), moving said high operating voltage gas discharge lamp away from said area.

10. The method of claim 8, wherein step (4) comprises:

after step (3), activating said high operating voltage gas discharge lamp having a fill gas comprising neon to temporarily illuminate said area during finding and removal of said broken glass.

11. The method of claim 9, wherein step (4) comprises:

after step (3), activating said high operating voltage gas discharge lamp having a fill gas comprising neon to temporarily illuminate said area during finding and removal of said broken glass.

* * * * *